(12) United States Patent
Edwards

(10) Patent No.: US 6,539,973 B1
(45) Date of Patent: Apr. 1, 2003

(54) WATER PRESSURE-ASSISTED FLUSH VALVE

(75) Inventor: Harry W. Edwards, Barrington, IL (US)

(73) Assignee: George S. Cole & Associates, Incorporated, Englewood, CO (US)

(*) Notice: Subject to any disclaimer, the term of this patent is extended or adjusted under 35 U.S.C. 154(b) by 0 days.

(21) Appl. No.: 10/043,834

(22) Filed: Jan. 14, 2002

(51) Int. Cl.[7] .................. F16K 31/34; F16K 31/163; F16K 31/20
(52) U.S. Cl. .................. 137/413; 137/218; 137/416; 137/426; 137/432; 251/5; 251/7
(58) Field of Search .................. 137/413, 414, 137/415, 416, 418, 420, 422, 426, 430, 432, 451, 218; 251/5, 7

(56) References Cited

U.S. PATENT DOCUMENTS

| | | | | |
|---|---|---|---|---|
| 209,867 A | * | 11/1878 | Craige | 137/414 |
| 569,841 A | * | 10/1896 | Sandillion | 137/413 |
| 1,010,562 A | | 12/1911 | Woodward | 137/451 |
| 1,208,274 A | | 12/1916 | Besler | 137/451 |
| 2,731,030 A | * | 1/1956 | Phillips et al. | 137/413 |
| 3,333,575 A | | 8/1967 | Spencer | 119/75 |
| 3,508,574 A | | 4/1970 | Skerritt | 137/451 |
| 3,625,264 A | * | 12/1971 | Swain | 137/413 |
| 3,670,751 A | | 6/1972 | Buswell | 137/451 |
| 3,850,209 A | | 11/1974 | Zweigardt | 137/451 |
| 3,893,475 A | * | 7/1975 | Hudson | 137/414 |
| 3,913,882 A | | 10/1975 | Moulet | 137/451 |
| 3,965,925 A | | 6/1976 | Gooch | 251/9 |
| 3,996,960 A | | 12/1976 | Martinez-Lozano | 137/451 |
| 4,072,164 A | * | 2/1978 | Kaden | 137/414 |
| 4,114,642 A | * | 9/1978 | Robbins | 137/436 |
| 4,286,618 A | | 9/1981 | Bang et al. | 137/451 |
| 4,372,345 A | | 2/1983 | Mehus | 251/9 |
| 4,457,699 A | | 7/1984 | Hattori | 251/7 |
| 5,042,526 A | | 8/1991 | Kulakoff | 137/451 |
| 5,090,443 A | | 2/1992 | Jacobsen | 137/451 |
| 5,642,752 A | * | 7/1997 | Yokata et al. | 137/413 |
| 5,850,849 A | * | 12/1998 | Wood | 137/422 |
| 5,896,887 A | | 4/1999 | Edwards | 137/418 |
| 6,035,888 A | * | 3/2000 | Gil | 137/413 |
| 6,123,099 A | | 9/2000 | Edwards | 137/416 |
| 6,138,709 A | * | 10/2000 | Home | 137/413 |
| 6,178,994 B1 | * | 1/2001 | Park | 137/413 |

FOREIGN PATENT DOCUMENTS

| | | | | |
|---|---|---|---|---|
| AU | 100135 | * | 2/1937 | 137/413 |

* cited by examiner

Primary Examiner—George L. Walton
(74) Attorney, Agent, or Firm—Seyfarth Shaw

(57) ABSTRACT

A flush valve assembly includes a resilient pinch tube disposed in a conduit between a pressurized water source and a toilet flush tank and is pinched closed by a piston disposed in a cylinder formed in a bracket mounted on the conduit. The piston is engageable by a float which moves it between closed and open positions with changes in water level. A tube connects the source to the cylinder. When the float moves to the closing position it closes a drain port in the cylinder so that water pressure in the cylinder assists the piston. A manually adjustable screw on the float cammingly engages a bead on the conduit to yieldably arrest upward float movement and provide snap-action shutoff of the valve.

22 Claims, 3 Drawing Sheets

WATER PRESSURE-ASSISTED FLUSH VALVE

BACKGROUND

This application relates to apparatus for controlling the liquid level in vessels and, in particular, to such apparatus for use in toilet flush tanks. The apparatus disclosed herein is an improvement of that disclosed in U.S. Pat. No. 6,123,099.

The aforementioned patent discloses several types of valves utilizing a flexible, resilient pinch tube as the valve member, which is controlled by an actuator engageable with the outside of the tube to pinch it closed. The embodiment disclosed in FIGS. 12–17 of that patent utilizes a float which encircles and rides up and down along an upright fill tube so as to occupy less lateral. space in the tank. A rib on the float engages a similar rib on the fill tube to temporarily arrest the upward movement of the float. The arresting mechanism resiliently yields when the buoyancy force of the rising water level on the float reaches a sufficient value, for suddenly closing the valve to provide a snap-action shutoff. The shutoff water level, however, is not adjustable.

Furthermore, prior valve mechanisms utilizing pinch tube valves are designed to operate over a relatively narrow range of water pressures and may not completely close at higher water pressures.

SUMMARY

This application discloses a flush valve assembly which avoids the disadvantages of prior valve assemblies while affording additional structural and operating advantages.

An important aspect is the provision of a flush valve assembly which provides a snap-action valve shutoff while, at the same type, affording easy manual adjustment of the shutoff water level.

Another aspect is the provision of a flush valve assembly which is operable over a wide range of water pressures, including very high water pressures.

Still another aspect is the provision of a flush valve assembly of the type set forth, which utilizes water pressure to assist valve closure.

Yet another aspect is the provision of a unique method of flush valve assembly operation.

Certain ones of these and other aspects may be attained by providing a flush valve assembly for controlling flow of liquid from a pressurized source to a vessel comprising: a conduit coupled between the source and the vessel and having a closeable portion, a closing mechanism shiftable between an opening condition and a closing condition cooperating with the closeable portion for closing it, the closing mechanism including a cylinder having a control port therein and coupled to the source and a piston disposed in the cylinder, and a liquid level-responsive mechanism for closing the control port so that source pressure in the cylinder drives the piston toward the closing condition of the closing mechanism.

Still other aspects may be attained by providing a flush valve assembly of the type set forth, wherein the liquid level-responsive mechanism includes a float coupled to the closing mechanism and disposed in the liquid in the vessel for movement in response to changes in the liquid level in the vessel, and further comprising a control mechanism including a first arresting portion carried by the float and a second arresting portion cooperatively associated with the float, one of the first and second arresting portions including a manually adjustable portion for selectively varying degree of interference between the first and second arresting portions, the control mechanism being responsive to rising of the float to a predetermined stop level below a highest level for moving to a stop condition with the first arresting portion engaging the second arresting portion for mechanically arresting further upward movement of the float, the control mechanism, when in the stop condition, being responsive to a predetermined buoyancy force exerted on the arrested float when the liquid has risen substantially to the highest level for shifting to a release condition by disengagement of the first arresting portion from the second arresting portion for releasing the float and permitting the float to move suddenly to the highest level to actuate the closing mechanism to its closing condition.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
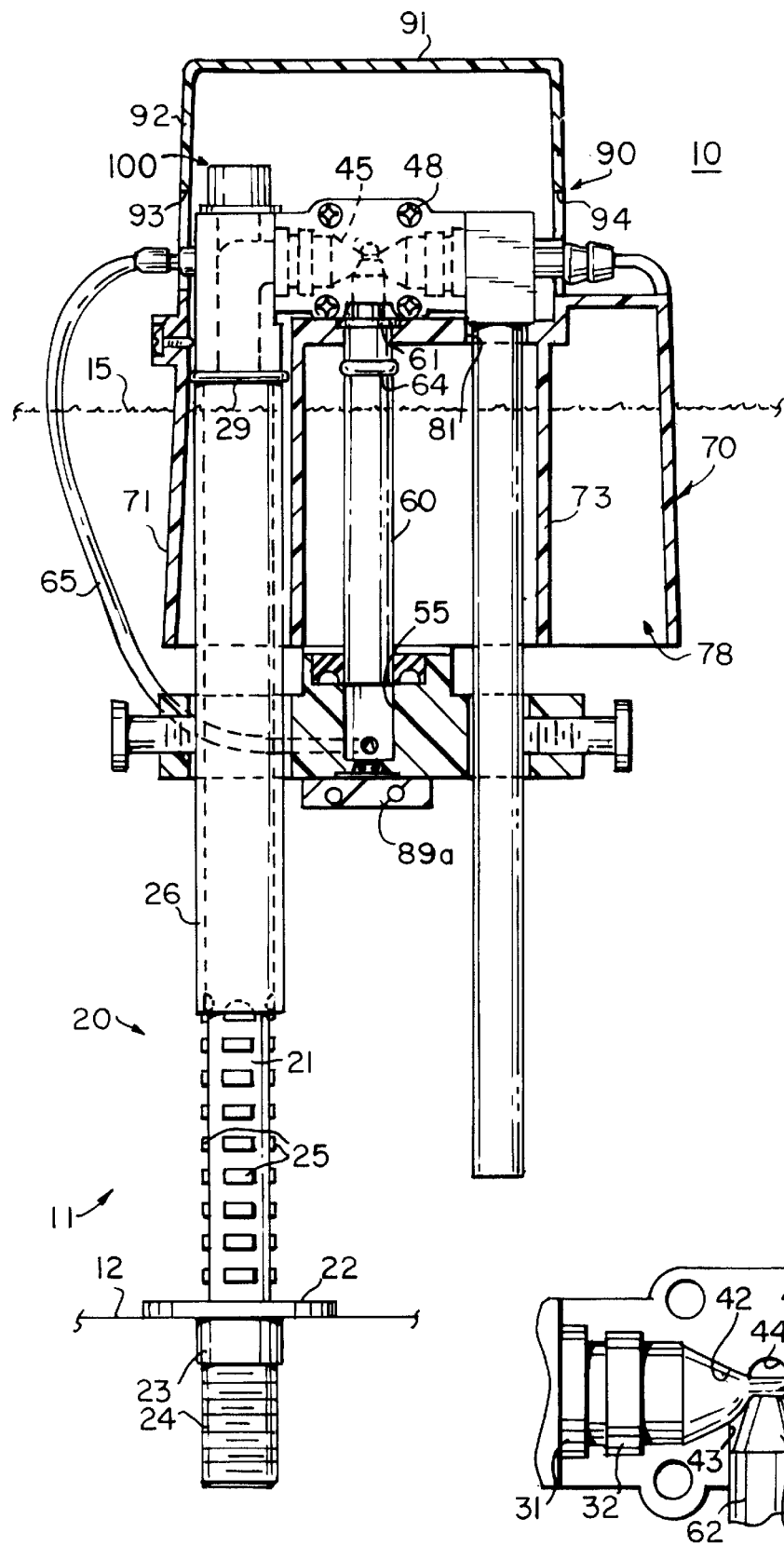
FIG. 1 is a side elevational view in partial vertical section of a flush valve assembly mounted in a flush tank, with the valve assembly in its closed condition.
Figure 2:
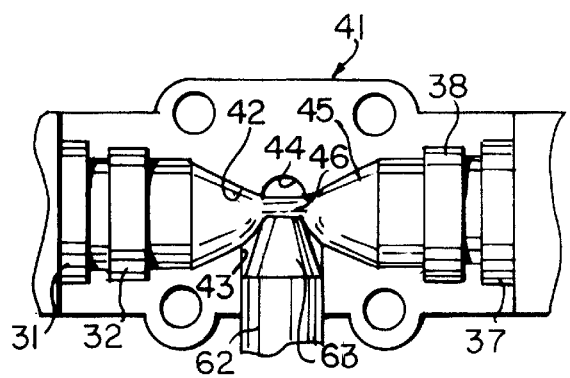
FIG. 2 is an enlarged, fragmentary, side elevational view of the valve housing of the flush valve assembly of FIG. 1 with the front plate thereof removed.
Figures 3, 4:
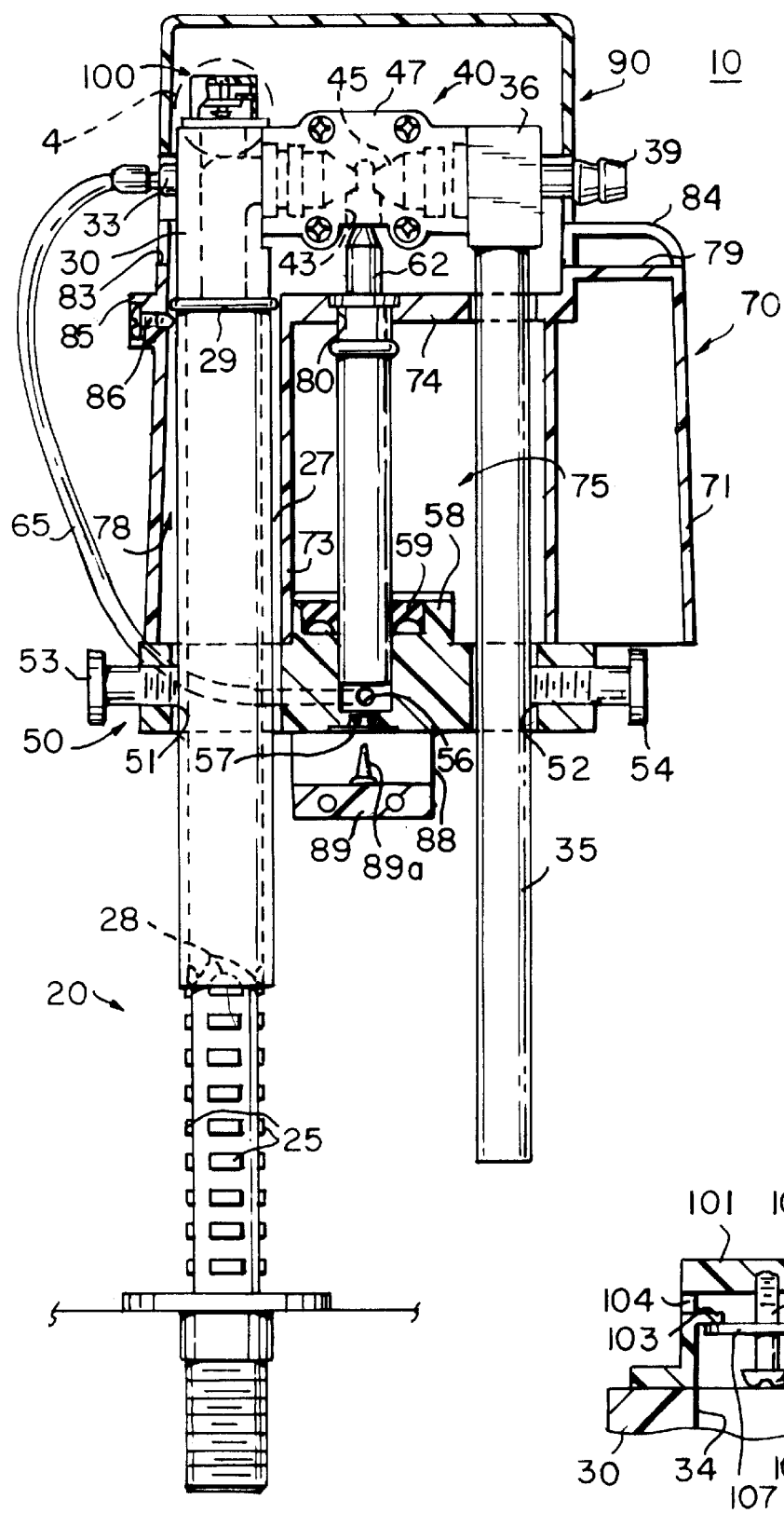
FIG. 3 is a view similar to FIG. 1 with the valve assembly in its open condition.
FIG. 4 is an enlarged, fragmentary, sectional view of the encircled portion of the flush valve assembly of FIG. 3.

Referring to FIGS. 1–4 there is illustrated a flush valve assembly, generally designated by the numeral 10 for use in a toilet flush tank 11 for controlling refilling of the flush tank subsequent to a flushing operation. The tank 11 has a bottom wall 12 and a peripheral side wall (not shown) and contains water which fills the tank 11 to a predetermined level 15 (FIG. 1). The flush valve assembly 10 includes a conduit in the form of an adjustable-height fill pipe assembly 20, including a fixed pipe 21 having a radially outwardly extending annular flange 22 and a cylindrical collar 23 which depends from the flange 22 and is receivable in a complementary opening in the bottom wall 12. Depending from the collar 23 is an externally threaded stem 24 for coupling to an associated pressurized water source and for receiving a mounting nut, all in a known manner. A suitable gasket (not shown) may be disposed beneath the flange 22 for sealing against the bottom wall 12. Projecting from the outer surface of the pipe 21 at equiangularly spaced-apart locations thereon are four rows of vertically-spaced adjustment lugs 25. The upper end of the fixed pipe 21 is telescopically received in the lower end of an adjustable pipe 26, provided along its upper half with a radially outwardly projecting and longitudinally extending key 27 (FIG. 3). Projecting radially inwardly from the pipe 26 at its lower end are four equiangularly spaced stop lugs 28. As will be explained more fully below, the flush valve assembly 10 is supported on the fill pipe assembly 20 and its overall height may be adjusted by rotating the adjustable pipe 26 until the stop lugs 28 are respectively disposed in the gaps between the rows of adjustment lugs 25, then moved to the desired height and rotated back one-eighth turn so that the stop lugs 28 engage the adjustment lugs 25, as illustrated in the drawings. Projecting radially outwardly from the pipe 26 adjacent to its upper end is a circumferential bead or rib 29.

Fixedly secured to the upper end of the pipe 26 by suitable means and communicating therewith is an elbow 30 provided with a horizontally projecting nipple 31 having a circumferential flange 32 (see FIG. 2). Also projecting from the elbow 30 in the opposite direction from the nipple 31 is a nipple 33. A port 34 (see FIG. 4) is formed in the upper end of the elbow 30. There is also provided a tank supply pipe 35 which is disposed in use substantially vertically and is provided at its upper end with an elbow 36 having a nipple 37 provided with a flange 38 and also having an oppositely directed nipple 39.

The elbow 36 is coupled to the elbow 30 by means of a valve housing 40 which is a two-part construction including mating back and front body plates 41 and 47. Referring to FIG. 2, the back body plate 41 is adapted to fit over the nipples 31 and 37 of the elbows 30 and 36, being provided with an appropriately shaped recess, the flanges 32 and 38 cooperating with the recess to lock the plate 41 to retain it in place. The recess has a central hourglass-shaped portion 42, the central portion of which communicates with a vertically extending recess 43. A backstop hole 44 is formed in the plate 41 just above the central portion of the recess 42. Received in the recess 42 is a generally hourglass-shaped flexible and resilient pinch tube 45, the opposite ends of which are respectively fitted in the nipples 31 and 37. The valve tube 45 has a flattened central neck portion 46. The front body plate 47 is dimensioned for mating engagement with the back body plate 41 having a complementary-shaped recess for accommodating the nipples 31 and 37 and the valve tube 45 and having a slot recess which mates with the recess 43. Projecting from the inner surface of the front body plate 47 are four stakes, respectively received in complementary bores 48a in the back body plate 41 and which may be secured in place, as by ultrasonic welding. A backstop post also projects from the front body plate 47 and is received in the hole 44 to provide a backstop for the valve member 45. When the valve housing 40 is thus assembled it is rigidly fixed to the elbow 30 and supports the elbow 36 and the tank supply pipe 35 so that the latter is substantially parallel with the fill pipe assembly 20.

There is also provided a support bracket 50 which has holes 51 and 52 formed therethrough for respectively receiving the fill pipe assembly 20 and the tank supply pipe 35. Set screws 53 and 54 are respectively engageable with the adjustable pipe 36 and the tank supply pipe 35 for locking the support bracket 50 in place at any desired height. Formed in the central portion of the support bracket 50 is an upwardly-open cylinder 55 having a supply port 56 formed in the side thereof and a drain port 57 formed in the bottom thereof. Projecting upwardly from the bracket 50 in surrounding relationship with the cylinder 55 is an annular seal receptacle 58 which receives a suitable annular seal 59.

An elongated cylindrical piston 60 is received through the seal 59 in fluid-tight sealing engagement therewith and into the upper end of the cylinder 55 for sliding vertical movement therein. The piston 60 is provided adjacent to its upper end with a radially outwardly extending annular flange 61, from which projects a reduced-diameter tip 62 provided with a tapered end 63. An O-ring 64 encircles the piston 60 a short distance below the flange 61. A flexible tube 65 connects the nipple 33 of the elbow 30 with the supply port 56 of the cylinder 55.

Figure 5:
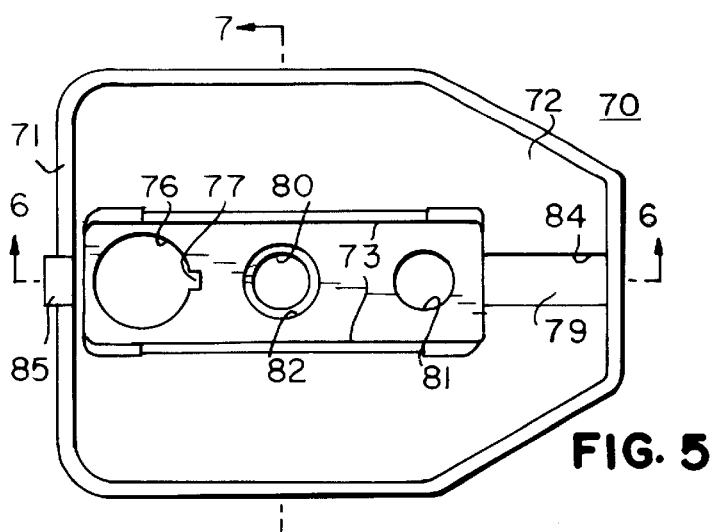
FIG. 5 is a top plan view of the float of the valve assembly of FIG. 1.
Figure 6:
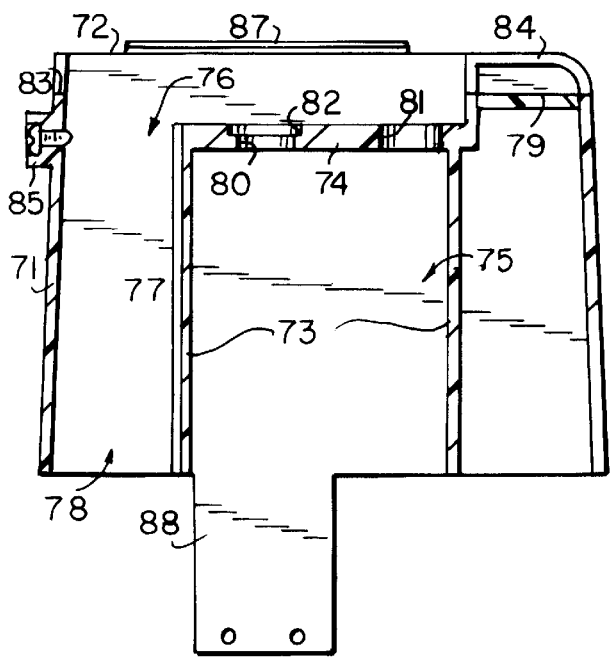
FIG. 6 is a view in vertical section taken generally along the line 6—6 in FIG. 5.
Figure 7:
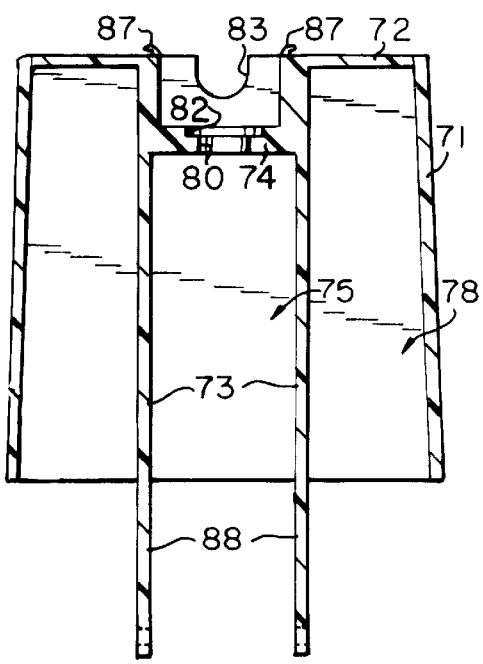
FIG. 7 is a view in vertical section taken generally along the line 7—7 in FIG. 5.

Referring now also to FIGS. 5–7, the flush valve assembly includes a float 70 which is generally in the nature of an open-bottom housing having an outer peripheral wall 71 which defines a generally rectangular shape, the sides of which are tapered adjacent to one end. The outer peripheral wall 71 is connected by a top wall 72 to a generally rectangular inner peripheral wall 73, which is closed adjacent to its upper end by a well wall 74 which is recessed below the top wall 72 and extends to the untapered end of the outer peripheral wall 71 and has a raised portion 79 which extends to the tapered end of the outer peripheral wall 71. The portion of the well wall 74 extending to the untapered end of the outer peripheral wall 71 has a circular opening 76 formed therein with a shallow rectangular keyway 77 at one side thereof which extends downwardly and is also formed in the adjacent outer surface of the inner peripheral wall 73. The inner peripheral wall 73 cooperates with the well wall 74 to define a central chamber 75, and cooperates with the outer peripheral wall 71 and the top wall 72 to define a peripheral chamber 78.

Formed through the well wall 74 are two circular bores 80 and 81, the former being provided with an enlarged-diameter counterbore 82 in the upper surface of the well wall 74. A notch 83 is formed in the upper edge of the untapered end of the outer peripheral wall 71, while a notch 84 is formed in the top wall 72 above the raised portion 70 of the well wall 74. A bracket 85 projects from the untapered end of the outer peripheral wall 71 and carries a set screw 86 which is threadedly engaged in a complementary opening in the outer peripheral wall 71. Short lips or beads 87 may project slightly upwardly from the top wall 72 along opposite sides of the inner peripheral wall 73. Rectangular tabs 88 depend from opposite sides of the inner peripheral wall 73 and mount therebetween a stop plate 89 carrying an upstanding pin 89a.

The fill pipe assembly 20 extends through the peripheral chamber 78 and the opening 76 in the well wall 74, while the tank supply pipe 35 extends through the central chamber 75 of the float 70 and the bore 81 in the well wall 74, so that the float 70 is disposed for free vertical movement guided by the fill pipe assembly 20 and the tank supply pipe 35. The float 70 is disposed above the support bracket 50, so that the bracket limits downward movement of the float in a valve-opening position, illustrated in FIG. 3, wherein the set screw 86 is spaced below the bead 29 and the piston 60 is out of engagement with the valve tube 45. The elbows 30 and 36 and the housing 40 are disposed in the well defined above the well wall 74. The pin 89a is spaced below the support bracket 50, so that the drain port 57 is open.

Figure 8:
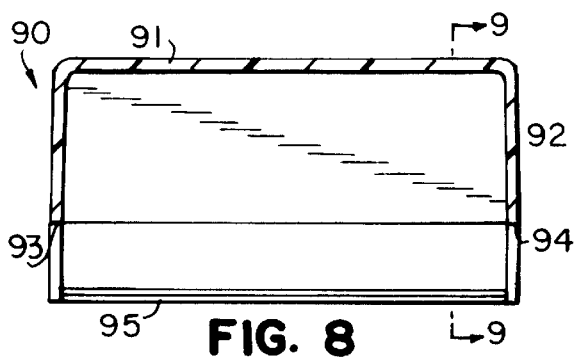
FIG. 8 is a view in vertical section of the float cap of the flush valve assembly of FIG. 1.
Figure 9:
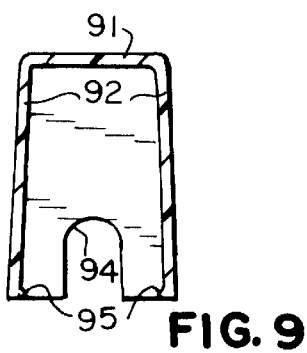
FIG. 9 is a sectional view taken generally along the line 9—9 in FIG. 8.

Referring also to FIGS. 8 and 9, the float 70 is provided with a cap 90 having a top wall 91 and a generally rectangular peripheral wall 92 with notches 93 and 94 respectively formed in the lower edge thereof at opposite ends thereof. Snap beads 95 are formed at the bottom edges of the opposite sides of the peripheral wall 92. The cap 90 is designed to fit over the well defined above the well wall 74, with the snap beads 95 snap fitting into engagement with the lips 87 on the float 70 for covering the elbows 30 and 36 and the valve housing 40, with the nipples 33 and 39 being respectively accommodated in the notches 93 and 94.

Referring to FIGS. 3 and 4, the flush valve assembly 10 is also provided with a vacuum breaker 100, which includes a generally cylindrical, open-bottom housing 101 provided at its lower edge with a radially outwardly extending peripheral flange 102 which is attached by suitable means to the top of the elbow 30 for communication with the port 34 therein. A radially inwardly projecting annular flange 103 is disposed in the housing 101.below the top wall thereof, side ports 104 in the housing being provided between the top wall and the flange 103. Threadedly engaged in the top wall of the housing centrally thereof and depending therefrom through the opening in the annular flange 103 is a pin 105 having an enlarged head 106 at its lower end. A membrane 107 encircles the pin 105 and is slidable therealong below the flange 103 and is dimensioned to close the opening in the flange 103.

In operation, when the valve assembly 10 is in its open condition illustrated in FIG. 3, water from the associated pressurized source flows freely through the fill pipe assembly 20, elbow 30, valve tube 45, elbow 36 and tank supply pipe 35 into the tank 11 for refilling it. It will be appreciated that a suitable tube or conduit (not shown) is coupled to the nipple 39 and communicates with the toilet bowl (not shown) for refilling the bowl, all in a known manner. Water also flows through the tube 65 to the cylinder 55, from which it drains through the drain port 57. Eventually, the rising water level in the tank will lift the float 70 off the support bracket 50 until the set screw 86 cammingly engages the bead 29 temporarily arresting upward movement of the float. The water level will continue rising until it reaches the predetermined shutoff level 15 (FIG. 1), at which point the buoyancy force on the float 70 will overcome the interference between the set screw 86 and the bead 29 causing the set screw to cam past the bead 29, allowing the float 70 to jump suddenly to the closing position illustrated in FIG. 1 for a snap-action shutoff of the valve. The nipples 33 and 39 will be accommodated in the float notches 83 and 84 to permit the float to jump to this closed position.

As the float 70 moves to the closed position, it engages a flange 61 on the piston 60, pulling the piston upwardly so that the reduced tip 62 thereof enters the slot recess 43 and the tapered end 63 engages and pinches shut the neck 46 of the pinch valve tube 45 against the backstop pin. As the float 70 moves to its closing position, the pin 89a is pulled up into the drain port 57 of the cylinder 55 for closing it, exposing the bottom of the piston 60 to source water pressure, which assists in driving the piston 60 upwardly to its valve-closing position and holding it in that position. This water pressure assist offers important advantages in allowing the flush valve assembly 10 to operate over a wide range of water pressures without any change in the valve equipment. Thus, a single pinch valve tube 45, which is selected to have a stiffness designed to operate optimally at a predetermined average water pressure (e.g. 50 psi), will work equally well at pressures as low as 3 psi or as high as 120 psi. In prior pinch tube valve designs, at very high water pressures, the buoyancy force on the float would not be sufficient to overcome the water pressure in the pinch valve tube and pinch it completely closed. Thus, a larger float would have to be used. In the flush valve assembly 10, on the other hand, as the water pressure rises, so does the pressure in the cylinder 55 and the upward assisting force on the piston 60, so that complete valve closure is assured without having to change the float. At lower water pressures, while the water-pressure assist on the piston 60 would be reduced, the buoyancy force on the float 70 would still be more than adequate to completely close the pinch valve tube 45.

Another significant aspect of the flush valve assembly 10 is that it permits simple adjustment of the full-tank water level by manual adjustment of the set screw 86, the screw being screwed in to increase the interference between it and the bead 29 to raise the water level required to close the valve, and the screw being backed off to decrease that level.

When the toilet is flushed, emptying the flush tank 11, the float 70 will drop with the water level, pulling the pin 89a out of the drain port 57 and relieving the pressure in the cylinder 55, allowing the piston 60 to lower and reopen the pinch valve tube 45. In order to prevent the piston from becoming stuck in the closed position, such as by friction in the cylinder 55 or in the slot recess 43, the dropping float 70 will engage the O-ring 64 on the cylinder, positively pulling it down until the float 70 is stopped on the support bracket 50 in the position of FIG. 3.

The vacuum breaker 100 is to prevent contamination of the water supply by siphoning of water from the tank 11 back through the fill pipe assembly 20 in the event that a vacuum is drawn upstream of the fill pipe assembly 20. In normal operation, the source water pressure holds the membrane 107 against the annular flange 103 for closing the opening therein. If a low pressure develops upstream, it will also lower the pressure in the cylinder 55 and might be sufficient to draw the piston 60 downwardly, opening the valve. But this low pressure will also pull the membrane 107 down along the pin 105 and against the head 106, opening the hole in the annular flange 130 and exposing the elbow 30 to atmosphere through the ports 104. Thus, air will be sucked into the fill pipe assembly 20, rather than water from the tank 11.

In a constructional model of the flush valve assembly 10, the pinch tube 45 may be formed of a suitable elastomeric material, such as rubber, or rubber-like material. Suitable elastomers could also be used for the seal 59 and the tube 65 and the O-ring 64. The remaining parts may be formed of suitable plastic materials.

From the foregoing, it can be seen that there has been provided an improved flush valve assembly which utilizes water pressure to assist a float in closing a pinch tube valve, so that the valve assembly operates effectively over a wide range of water pressures, while at the same time, offering easy manual adjustment of the shutoff water level.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A flush valve assembly for controlling flow of liquid from a pressurized source to a vessel comprising:
    a conduit coupled between the source and the vessel and having a closeable portion,
    a closing mechanism shiftable between an opening condition and a closing condition cooperating with the closeable portion for closing it,
    the closing mechanism including a cylinder having a control port fixed therein and coupled to the source and a piston disposed in the cylinder for movement relative to the control port, a liquid level-responsive mechanism for closing the control port so that source pressure in the cylinder drives the piston toward the closing condition of the closing mechanism, and a bracket being mounted on the conduit and defining the cylinder.

2. The flush valve assembly of claim 1, wherein the closeable portion includes a flexible and resilient portion.

3. The flush valve assembly of claim 2, wherein the piston is engageable with the flexible and resilient portion for closing it in the closing condition of the closing mechanism.

4. A flush valve assembly for controlling flow of liquid from a pressurized source to a vessel comprising:

a conduit coupled between the source and the vessel and having a closeable portion, a closing mechanism shiftable between an opening condition and a closing condition cooperating with the closeable portion for closing it, a float coupled to the closing mechanism and disposed in the liquid in the vessel for movement in response to changes in the liquid level in the vessel, and a control mechanism including a first arresting portion carried by the float and a second arresting portion cooperatively associated with the float, one of the first and second arresting portions including a manually adjustable portion for selectively varying degree of interference between the first and second arresting portions, the control mechanism being responsive to rising of the float to a predetermined stop level below a highest level for moving to a stop condition with the first arresting portion engaging the second arresting portion for mechanically arresting further upward movement of the float, the control mechanism, when in the stop condition being responsive to a predetermined buoyancy force exerted on the arrested float when the liquid has risen substantially to the highest level for shifting to a release condition by disengagement of the first arresting portion from the second arresting portion for releasing the float and permitting the float to move suddenly to the highest level to actuate the closing mechanism to its closing condition.

5. The flush valve assembly of claim 4, wherein the first arresting portion includes the manually adjustable portion.

6. The flush valve assembly of claim 4, wherein the manually adjustable portion includes a set screw.

7. The flush valve assembly of claim 4, wherein the manually adjustable portion includes a set screw, the other of the first and second arresting portions including a cam follower engageable with the set screw.

8. The flush valve assembly of claim 4, wherein the second arresting portion is disposed on the conduit.

9. The flush valve assembly of claim 4, wherein the closeable portion includes a flexible and resilient portion.

10. The flush valve assembly of claim 4, wherein the conduit includes adjustment structure for varying the length of the conduit.

11. A flush valve assembly for controlling flow of liquid from a pressurized source to a vessel comprising:

a conduit coupled between the source and the vessel and having a closeable portion, a closing mechanism shiftable between an opening condition and a closing condition cooperating with the closeable portion for closing it, the closing mechanism including a cylinder having a control port therein and coupled to the source and a piston disposed in the cylinder, a float coupled to the closing mechanism and disposed in the liquid in the vessel for movement in response to changes in the liquid level in the vessel, and a control mechanism including a first arresting portion carried by the float and a second arresting portion cooperatively associated with the float, one of the first and second arresting portions including a manually adjustable portion for selectively varying degree of interference between the first and second arresting portions, the control mechanism being responsive to rising of the float to a predetermined stop level below a highest level for moving to a stop condition with the first arresting portion engaging the second arresting portion for mechanically arresting further upward movement of the float, the control mechanism, when in the stop condition, being responsive to a predetermined buoyancy force exerted on the arrested float when the liquid has risen substantially to the highest level for shifting to a release condition by disengagement of the first arresting portion from the second arresting portion for releasing the float and permitting the float to move suddenly to the highest level to actuate the closing mechanism to its closing condition, the float including a portion disposed for closing the control port in response to movement of the float to the highest level so that the source pressure in the cylinder drives the piston toward the closing condition of the closing mechanism.

12. The flush valve assembly of claim 11, wherein the closeable portion includes a flexible and resilient portion.

13. The flush valve assembly of claim 12, wherein the piston is engageable with the flexible and resilient portion for closing it in the closing condition of the closing mechanism.

14. The flush valve assembly of claim 11, and further comprising a bracket mounted on the conduit and defining the cylinder.

15. The flush valve assembly of claim 11, wherein the first arresting portion includes the manually adjusting portion.

16. The flush valve assembly of claim 11, wherein the manually adjustable portion includes a set screw, the other of the first and second arresting portions including a cam follower engageable with the set screw.

17. A method of operating a flush valve assembly which includes a conduit coupled between a pressurized source of liquid and a vessel and having a closeable portion, the method comprising providing a cylinder having a piston movable to a closing condition coupled to the closeable portion for closing the same, exposing the cylinder to liquid from the pressurized source, providing a float in the vessel and using the float for closing the cylinder in response to liquid in the vessel rising to a predetermined level so that the cylinder is subjected to source pressure for driving the piston toward the closing condition, and mechanically engaging the float with the piston for assisting the movement of the piston to the closing condition in response to the rising liquid level.

18. The method of claim 17, wherein the closing of the closeable portion is effected by pinching shut a flexible and resilient portion of the conduit.

19. The method of claim 18, wherein the pinching is effected by direct engagement of the piston with the flexible and resilient portion.

20. The method of claim 17, wherein the mechanical assistance is effected by a float coupled to the piston and disposed in the vessel for movement in response to changes in the liquid level of the vessel.

21. A flush valve assembly for controlling flow of liquid from a pressurized source to a vessel comprising:

a conduit coupled between the source and the vessel and having a closeable portion, a closing mechanism shiftable between an opening condition and a closing condition cooperating with the closeable portion for closing it, the closing mechanism including a cylinder having a control port therein and coupled to the source and a piston disposed in the cylinder, and a liquid level-responsive mechanism for closing the control port so that source pressure in the cylinder drives the piston toward the closing condition of the closing mechanism, the liquid level-responsive mechanism including a float disposed in the liquid in the vessel for movement in response to changes in the liquid level in the vessel for closing the control port, the float including a portion directly engageable with the piston for moving the piston toward and away from the closing condition of the closing mechanism.

22. The flush valve assembly of claim 21, wherein the control port includes a drain hole in the cylinder, the float including a pin disposable in the drain hole for closing it.

* * * * *